United States Patent [19]

Imaizumi et al.

[11] Patent Number: 4,800,994
[45] Date of Patent: Jan. 31, 1989

[54] HYDRAULIC DAMPER OF ADJUSTABLE DAMPING FORCE TYPE

[75] Inventors: Tomio Imaizumi; Masahiro Ashiba, both of Kanagawa, Japan

[73] Assignee: Tokico Ltd., Kanagawa, Japan

[21] Appl. No.: 651,764

[22] Filed: Sep. 18, 1984

[30] Foreign Application Priority Data

Sep. 20, 1983 [JP] Japan .................... 58-145820[U]

[51] Int. Cl.$^4$ .............. F16F 9/50; F16F 9/34; F16K 5/10
[52] U.S. Cl. .................. 188/319; 188/322.15; 188/299
[58] Field of Search .......... 188/313, 317, 319, 322.11, 188/322.13, 322.15, 322.22, 278, 285, 299; 267/127; 280/707; 251/207, 208

[56] References Cited

U.S. PATENT DOCUMENTS

| 4,527,676 | 7/1985 | Emura et al. | 188/299 |
| 4,620,619 | 11/1986 | Emura et al. | 188/299 X |

FOREIGN PATENT DOCUMENTS

| 3241984 | 6/1983 | Fed. Rep. of Germany . | |
| 3304815 | 11/1983 | Fed. Rep. of Germany . | |
| 3321680 | 1/1984 | Fed. Rep. of Germany . | |
| 0065741 | 5/1980 | Japan | 188/317 |
| 58-70533 | 5/1983 | Japan . | |
| 58-92537 | 6/1983 | Japan . | |
| 0116212 | 7/1983 | Japan | 188/317 |
| 58-116213 | 7/1983 | Japan . | |
| 664770 | 1/1952 | United Kingdom . | |
| 2120355 | 11/1983 | United Kingdom . | |
| 2123922 | 2/1984 | United Kingdom . | |

Primary Examiner—Andres Kashnikow
Assistant Examiner—Richard Potosnak
Attorney, Agent, or Firm—Wenderoth, Lind & Ponack

[57] ABSTRACT

A hydraulic damper of adjustable damping force type includes a cylinder containing hydraulic liquid therein, a piston working in the cylinder and partitioning the interior thereof into first and second liquid chambers, a piston rod secured to the piston and extending through the first liquid chamber to the outside of the cylinder, a valve mechanism mounted on the piston for generating damping force both in extension and contraction strokes of the damper, and an adjusting mechanism for adjusting the damping force. The adjusting mechanism includes a coaxial bore formed in the piston rod and communicating permanently with the first liquid chamber through a radial hole in the piston rod, a tubular nut for securing the piston to the piston rod, a tubular guide fitted in the tubular nut and having first and second series of circumferentially spaced orifice openings of different effective area, a shutter rotatably disposed in the guide for selectively opening and closing the orifice openings, a control rod secured to the shutter and extending through the bore in the piston rod, a check valve provided in the nut and permitting liquid flow through the first series of orifice openings only in one direction, and the second series of orifice openings forming a passage by-passing the check valve.

2 Claims, 6 Drawing Sheets

HYDRAULIC DAMPER OF ADJUSTABLE DAMPING FORCE TYPE

BACKGROUND OF THE INVENTION

This invention relates to a hydraulic damper for use in a vehicle and particularly to a hydraulic damper of the kind including a cylinder receiving therein hydraulic liquid, a piston working in the cylinder and partitioning the interior of the cylinder into first and second chambers, a piston rod secured to the piston and extending through the first chamber to the outside of the damper, a damping force generating valve device mounted on the piston for generating damping force in the extension and contraction strokes of the damper, and a damping force adjusting mechanism for adjusting the damping force in response to, such, as the running condition of the vehicle.

The damping force generating device may be a single valve acting in both of the extension and contraction strokes or may be formed of two separate valves acting respectively in the extension and contraction strokes and preventing liquid flow in the respective reverse directions.

A hydraulic damper of the aforementioned kind is widely used in vehicles such as automobiles. The projecting end of the piston rod is usually connected to a sprung mass of the vehicle such as the chassis and the lower end of the cylinder is secured to an unsprung mass such as a wheel axle.

The damping force adjusting mechanism make it possible to adjust the damping force of the damper such that the damping force is reduced when the vehicle is running on a smooth road, thereby improving driving comfort, and that the damping force is increased when the vehicle is running on a rough road condition, thereby preventing excessive vertical movement of the chassis and preventing the bottoming phenomenon.

Typically, the damping force adjusting mechanism comprises a control rod extending rotatably through the piston rod, a by-pass passage for connecting the first and second chambers and by-passing the damping force generating valve or valves on the piston, and an adjusting valve or a shutter secured to the inner end of the control rod for adjusting the effective area of the by-pass passage in response to the rotation of the control rod. Further, a check valve is usually provided for changing the damping force between the contraction and extension strokes of the damper such that the damping force in the contraction stroke of the damper is about one half to one third ($\frac{1}{2}-\frac{1}{3}$) of the damping force in the extension stroke.

When the adjusting valve is adjusted to increase the passage area of the by-pass passage, the damping force decreases both in the extension and contraction strokes, whereby the desired ratio between the damping forces in the contraction and extension strokes cannot be maintained, and the decrease in the damping force in the extension stroke deteriorates the stability of the driving characteristics. It has been experienced that when the damping force of the damper is too small or the characteristic of the damper is too soft and the vehicle is running at a high speed, it is difficult to control or maintain the direction of the vehicle.

The check valve closes in the extension stroke and opens in the contraction stroke, and thereby reduces liquid flow in the by-pass passage in the extension stroke as compared with the contraction stroke.

Various proposals have been made with respect to such hydraulic dampers, and in one such proposal it is not possible to change the damping force both in the extension and contraction strokes at desired multiple steps independently.

One of the objects of the present invention is to provide a hydraulic damper wherein the damping force in the extension stroke and that in the contraction stroke can be set at a plurality of steps and independently from each other, whereby it is possible to obtain optimum damping force with respect to a particular running condition of the vehicle.

Another object of the invention is to provide a hydraulic damper having a damping force adjusting mechanism which is simple in construction and compact in size, particularly in axial length.

SUMMARY OF THE INVENTION

The present invention provides a hydraulic damper of adjustable damping force type including a cylinder containing hydraulic liquid therein, a piston working in the cylinder and partitioning the interior thereof into two chambers, a piston rod secured to the piston and extending through one of the liquid chambers to the outside of the cylinder, a valve mechanism mounted on the piston for generating damping force both in extension and contraction strokes of the damper, and an adjusting mechanism provided independently from the valve mechanism and including a passage having a plurality of orifice openings having different effective areas, a shutter cooperating with the orifice openings for selectively opening and closing the orifice openings and being operable from the outside of the damper, and a check valve for controlling the liquid flow through the passage during either one of extension and contraction strokes of the damper. A tubular member is mounted on the inner end of the piston rod, a guide is fitted in the tubular member for rotatably receiving therein the shutter, and a control rod extends through the piston rod and is connected to the shutter. The orifice openings are formed in the guide, the check valve opens or closes in response to the direction of flow passing through the orifice opening(s), and a plurality of orifice passages having different passage areas are provided between the shutter and the guide and not passing through the check valve, such orifice passages being selectively opened and closed by the shutter.

BRIEF DESCRIPTION OF THE DRAWINGS

Further objects and advantages of the invention will become apparent from the following detailed description taken with reference to accompanying drawings exemplifying some preferred embodiments of the invention, and in which.

DETAILED DESCRIPTION OF THE PREFERRED EMBODIMENTS

Figure 1:
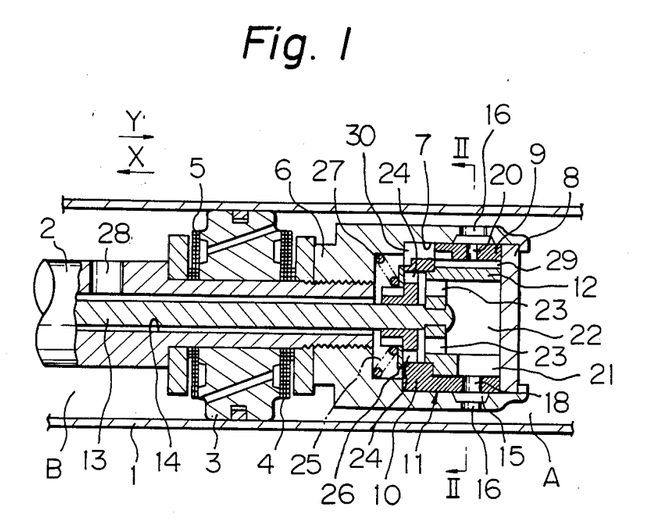
FIG. 1 is a partial longitudinal sectional view of a hydraulic damper according to the invention.

The hydraulic damper shown in FIG. 1 comprises a cylinder 1 containing therein hydraulic liquid, a piston 3 working in the cylinder 1 and partitioning the interior thereof into two liquid chambers A and B, and a piston rod 2 secured to the piston 3 and extending through one liquid chamber B and projecting to the outside through one end (not shown) of the cylinder 1. On opposite surfaces of the piston 3, there are provided disc valves 4 and 5 acting respectively as a damping force generating device of an extension side and a damping force generating device of a contraction side. When the piston 3 and the piston rod 2 move in the direction of arrow X or in an extending direction at a speed higher than a predetermined speed, the disc valve 4 deflects and generates a damping force. Similarly the disc valve 5 acts to generate a damping force in the contraction stroke, i.e. during movement in the direction of arrow Y.

A tubular member 6 is threadingly secured to the piston rod to act as a nut fixing the piston 3 and the disc valves 4 and 5 on the piston rod 2. A space 7 is defined in the tubular member 6 for receiving therein a damping force adjusting mechanism according to the invention. A closure plate 8 is secured to the tip end of the tubular member 6 to close the space 7. A guide 11 consisting of a passage forming portion 9 and a valve forming portion 10 is fitted and secured to the inner circumferential wall of the tubular member 6 by force fitting or the like process. A shutter 12 is rotatably fitted in the guide 11. A control rod 13 is secured to the shutter 12 and extends through a coaxial bore 14 in the piston rod 2, with the outer end (not shown) of the rod 13 being located outside of the piston rod and being connected to a driving device (not shown) such as an electric motor or a solenoid.

Figure 2:
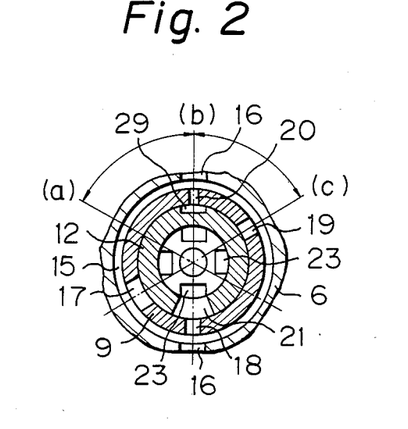
FIG. 2 is a sectional view taken along line II—II in FIG. 1.
Figure 3:
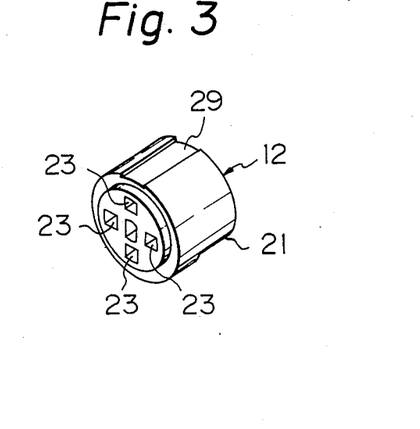
FIG. 3 is a perspective view of a shutter.

An annular liquid chamber 15 is formed between the inner circumference of the tubular member 6 and the passage forming portion 9 of the guide 11, and the liquid chamber 15 is permanently communicated through a plurality of openings 16 in the tubular member 6 with the liquid chamber A. As shown in FIG. 2, there are provided four orifice passages 17, 18, 19 and 20 having different passage areas respectively in the passage forming portion 9 of the guide 11. One end of each orifice passage opens permanently to the liquid chamber 15 and the other end thereof opens to the surface engaging with the shutter 12. As shown in FIG. 3, a groove 21 is formed in the outer circumference of the shutter 12 which, as will be described hereinafter, selectively opens and closes the orifice passages 17 and 18 upon rotation of the shutter 12, thereby communicating the liquid in the liquid chamber A with a liquid chamber 22 which is defined in the inner space of the shutter 12. A plurality of openings 23 are formed in a radially extending wall of the generally cup-shaped shutter 12 and, the openings 23 are communicated with a plurality of openings 24 formed in the valve forming portion 10 of the guide 11 through an annular space defined between the inner surface of the valve forming portion 10 and adjacent surface of the radial wall of the shutter 12. A check valve 26 is provided to cooperate with the openings 24 for permitting liquid flow from the openings 24 to a liquid chamber 25 which is formed between the valve forming portion 10 of the guide 11 and the inner surface of the tubular member 6 and preventing liquid flow in the opposite direction. A spring 27 normally presses the check valve 26 toward the closed condition. The liquid chamber 25 is permanently communicated with the liquid chamber B through the coaxial bore 14 and a radial hole 28 in the piston rod 2.

The shutter 12 further has a passage 29 which is defined by an axially extending groove formed in the outer circumference of the shutter 12 and, as will be described hereinafter, the passage 29 is selectively communicated with orifice passages 19 and 20 upon rotation of the shutter 12. The passage 29 is permanently communicated with the liquid chamber 25 in the tubular member 6 through a passage 30 connecting the outer and inner surfaces of the guide 11.

The damping force adjusting mechanism according to the invention and having the aforesaid constitution comprises a first passage consisting of openings 16, the liquid chamber 15, the orifice passage 17 or 18, the groove 21, the openings 23, the openings 24, the check valve 26, the liquid chamber 25, the bore 14 and the radial hole 28 between the liquid chambers A and B passing through the check valve 26 and, a second passage consisting of openings 16, the liquid chamber 15, orifice passage 19 or 20, the passage 29, the passage 30, the liquid chamber 25 and the radial hole 28 between the liquid chambers A and B. The effective passage area of the first passage is defined by the orifice passage 17 or 18 and the effective area of the second passage which by-passes the check valve is defined by the orifice passage 19 or 20. The orifice passages 17 and 19 respectively have passage areas larger than the orifice passages 18 and 20. The orifice passages 17 and 18 are respectively located at angular positions separated by 180 degrees from orifice passages 19 and 20. When the shutter 12 is located at position (a) in FIG. 2 with a line connecting the groove 21 and the passage 29 being on the line (a), the orifice passages 17, 18, 19 and 20 are closed by the shutter 12 and the adjusting mechanism takes a fully closed position. When the shutter 12 rotates by 60 degrees from the position (a) to position (b), the groove 21 and the passage 29 of the shutter 12 are located as shown in FIG. 2 and the first passage passing through the check valve opens with the passage area being defined by the orifice passage 18 and the second passage not passing through the check valve opens with the passage area being defined by the orifice passage 20, and the adjusting mechanism is in a small area position. When the shutter 12 is further rotated by 60 degrees to position (c), the first passage passing through the check valve opens with the passage area being defined by orifice passage 17 and the second passage not passing through the check valve opens with the passage area being defined by the orifice passage 19. The adjusting mechanism than is in a large area position.

Figure 4:
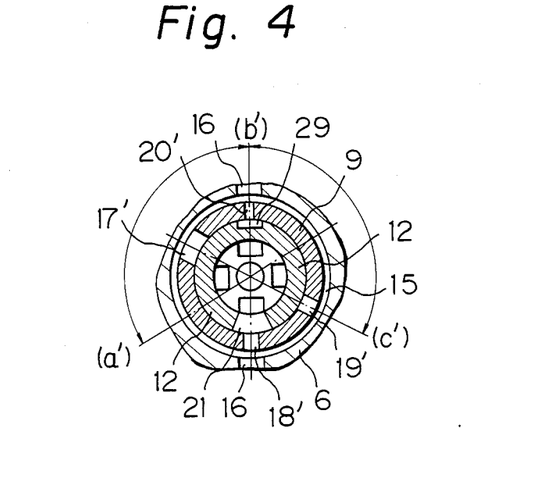
FIG. 4 is a sectional view similar to FIG. 2 but showing a modified form.

FIG. 4 shows a modified form wherein orifice passages 17', 18', 19' and 20' are formed in the passage forming portion 9 of the guide 11 as shown in the drawing. The angles of rotation of the shutter 12 between the fully closed position (a') and the small area position (b') and between the small area position (b') and the large area position (c') are 120 degrees respectively.

Figure 5:
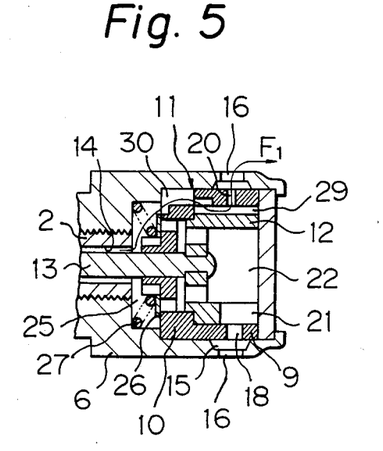
FIG. 5 and FIG. 6 are explanatory views showing operating conditions of a damping force adjusting mechanism.

The operation of the first embodiment of the invention will now be explained with reference to FIG. 5 to FIG. 7.

When the shutter 12 is located at small area position (b) in FIG. 2 and the piston rod 2 moves in the extending direction or the direction X in FIG. 1, the pressure in the liquid chamber B increases and the liquid in the chamber B flows into the liquid chamber 25 through the radial hole 28 and the bore 14. The check valve 26 is maintained in the closed condition and the first passage passing through the check valve is maintained closed. The liquid in the liquid chamber 25 flows into the liquid chamber A as shown by arrow $F_1$ in FIG. 5, sequentially from the passage 30, passage 29, the orifice passage 20, the chamber 15 and openings 16, and the orifice passage 20 generates a predetermined damping force. It will be understood that when the speed of the piston rod 2 or the piston 3 exceeds a predetermined level, the disc valve 4 mounted on the piston 3 opens and, a large amount of liquid passes through the disc valve 4, thus, the damping force at that condition is mainly defined by the disc valve 4.

Figure 6:
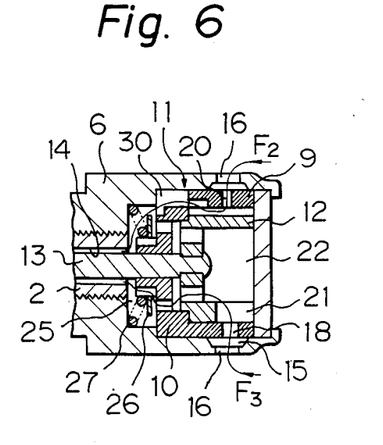

When the piston rod 2 and the piston 3 moves in the direction of arrow Y in FIG. 1 or in the contracting direction, the liquid in the chamber A flows into the chamber B through the first passage passing through the check valve as shown by arrow $F_3$ in FIG. 6 and also through the second passage not passing through the check valve as shown by arrow $F_2$ in FIG. 6. The orifice passages 18 and 20 act to generate damping force. When the speed of the piston 3 exceeds a predetermined level, the disc valve 5 mounted on the piston 3 opens and, thereafter, the damping force is mainly determined by the characteristic of the disc valve 5.

When the shutter 12 takes the large area position (c), the damping force in the extension stroke is generated by the orifice passage 19 and the damping force in the contraction stroke is generated by the orifice passage 19 and the orifice passage 17. The damping force characteristic curves in the extension and contraction strokes are more gradient as compared respectively with those of the small area position (b).

Figure 7:
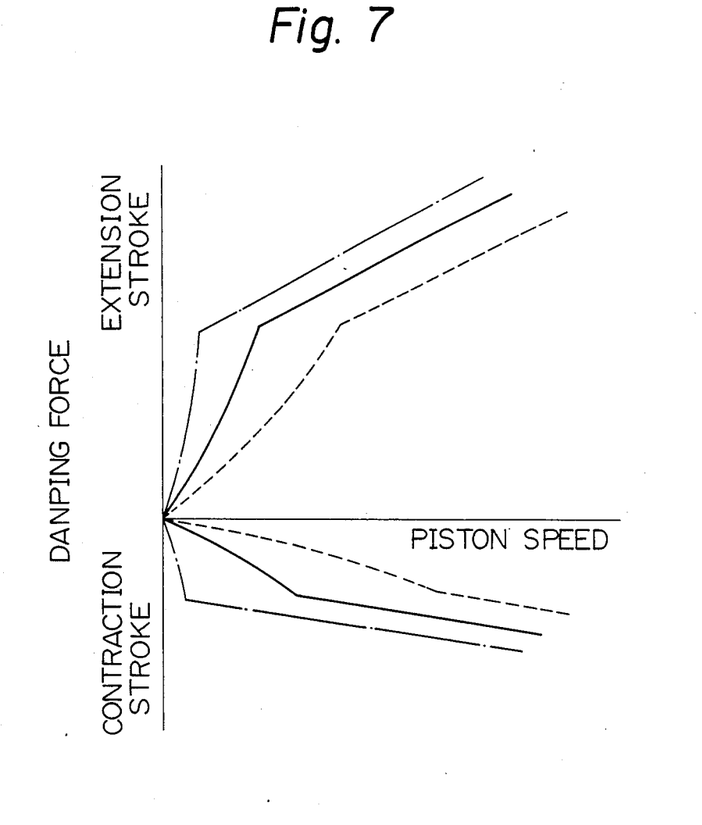
FIG. 7 is a diagram showing damping force characteristics.

When the shutter 12 takes the fully closed position (a) the first and second passages are maintained at closed condition and the damping forces in the extension and contraction strokes are defined by the valve mechanisms 4 and 5 on the piston 3 as shown by chain lines in FIG. 7.

The solid lines in FIG. 7 depict the damping force characteristic curves at the small area position (b) of the adjusting mechanism, and the broken lines depict those at the large area position (c). As shown in FIG. 7, the characteristic curves both in the extension and contraction strokes change distinctively in three steps. By suitably determining the number, the location and passage area of the orifice passages, it is possible to adjust optimumly the damping force characteristics in response to the running condition of the vehicle, thereby improving driving comfort and improving steering characteristics.

FIGS. 8–11 show a second embodiment of the invention which is generally similar to the first embodiment of FIG. 1, and corresponding parts are depicted by the same reference numerals and detailed description thereof is omitted.

Figure 8:
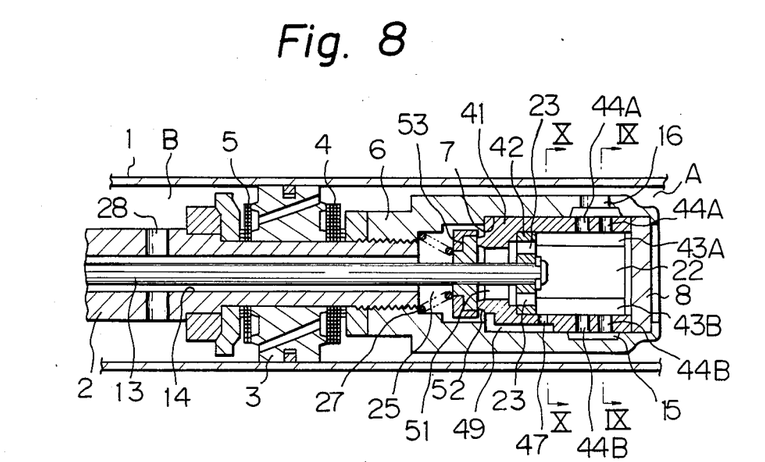
FIG. 8 is a partial longitudinal sectional view of a hydraulic damper according to a second embodiment of the invention.
Figure 9:
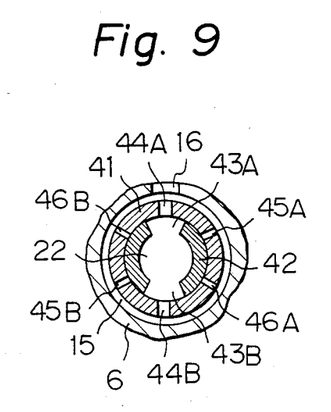
FIG. 9 is a sectional view taken along line IX—IX in FIG. 8.
Figure 10:
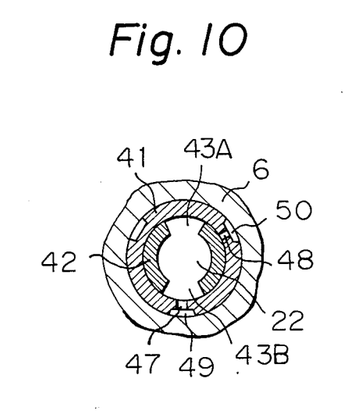
FIG. 10 is a sectional view taken along line X—X in FIG. 8.

In FIG. 8, a guide 41 having an integral passage forming portion and a valve forming portion is forcibly fitted in the tubular member 6. It will be understood that the guide 11 in FIG. 1 also can include an integral passage forming portion 9 and the valve forming portion 10 but, practically, a tubular passage forming portion 9 and a plate like valve forming portion 10 are abuttingly disposed in the tubular member 6, and this complicates the manufacturing and assembling operations. A shutter 42 in FIG. 8 has a pair of axially extending and diametrically opposed slits or grooves 43A and 43B in the circumferential wall thereof. The guide 41 has three sets of orifice passages 44A, 44B; 45A, 45B and 46A, 46B having passage areas different from each other, and each set of orifice passages is selectively communicated with the liquid chamber 22 within the shutter 42 upon rotation thereof. The guide 41 further has two orifice passages 47 and 48 at a location axially spaced from the aforesaid three sets of orifice passages. First ends of orifice passages 47 and 48 open permanently to the liquid chamber 25 through axially extending grooves or passages 49 and 50 formed in the outer circumference of the guide 41. The other ends of orifice passages 47 and 48 open selectively to the chamber 22 through the slit 43A or 43B upon rotation of the shutter 42.

An opening 51 is formed in the guide 41 to surround the control rod 13 and a valve seat 52 is formed on the outer circumference of the opening 51. A check valve 53 cooperating with the valve seat 52 is slidably fitted on the control rod 13. In the embodiment of FIG. 8, both of the first passage passing through the check valve and the second passage not passing through the check valve pass through the liquid chamber 22, and thus the second passage passes through the orifice passage 47 or 48 and the orifice passage 49 or 50.

Figure 11:
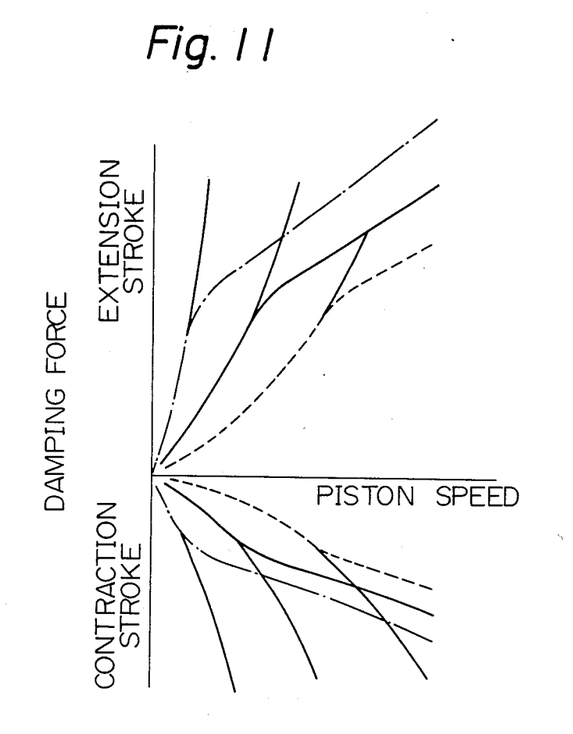
FIG. 11 is a diagram showing damping force characteristics of the second embodiment.

By rotating the shutter 42, it is possible to change the damping force characteristics by three steps as shown in FIG. 11. Namely, when the orifice passages 44A and 44B and the orifice passage 47 are opened (large area condition) the damper takes a low damping force condition as depicted in broken lines by FIG. 11, and when the orifice passages 45A and 45B and orifice passage 48 are opened (small area condition) the damper takes a medium damping force condition as shown by solid lines in FIG. 11. When the orifice passages 46A and 46B are opened, the damper takes a high damping force condition as shown in chain lines by FIG. 11.

The orifice passages 44A, 44B, 45A, 45B, 46A and 46B controlling the passage area of the first passage passing through the check valve are formed axially separated from the orifice passages 47 and 48, thus, the number, the angular or circumferential location and the passage area can be determined freely and independently.

It will be understood that FIGS. 1 and 8 show the essential portion of the damper which may be of the dual tube type or single tube type, and the damping force generating valve mechanisms 4 and 5 mounted on the piston 3 may be replaced by any desired publicly known valve mechanism or valve mechanisms. Further, it has been described that the damping force in the extension stroke is larger than that in the contraction stroke, but, it is possible to provide that the damping force in the contraction stroke is larger than that in the extension stroke, in which case the check valve is arranged in the reverse direction. The damping force in both embodiments changes at three steps, but it is possible to adjust the damping force at four or more steps.

Figure 12:
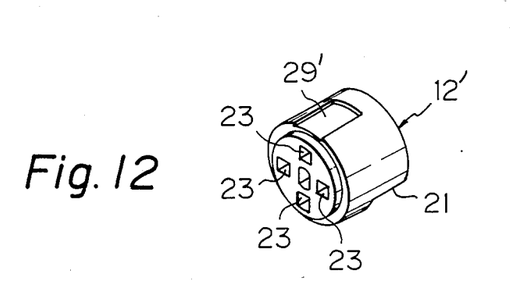
FIG. 12 is a perspective view of a shutter modified from that of the first embodiment.

Further, the shutter 12 shown in FIG. 1 may be modified as shown in FIG. 12 wherein axial extension of the groove 29 shown in FIG. 3 is reduced as shown at groove 29' in FIG. 12.

As described heretofore, according to the invention, it is possible to adjust the damping force in the extension and contraction strokes of the damper at a plurality of steps in response to the running conditions of the vehicle thereby improving the driving feel and maintaining good stability of directional control of the vehicle. Further, adjusting mechanism is simple in the construction and is compact in size.

What is claimed is:

1. In a hydraulic damper of the adjustable damping force type and including a cylinder containing hydraulic liquid therein, a piston working in said cylinder and partitioning the interior thereof into two liquid chambers, a piston rod secured to said piston and extending through a first said liquid chamber to the outside of said cylinder, a valve mechanism mounted on said piston for generating damping force both in extension and contraction strokes of the damper, and an adjusting mechanism provided independently from said valve mechanism and including a passage having a plurality of orifice openings each having a different effective area, a shutter cooperating with said orifice openings for selectively opening and closing said orifice openings and being operable from outside the damper, and a check valve for controlling the liquid flow through said passage, the improvement comprising:
    a tubular member having a first end mounted on the inner end of said piston rod;
    a closure member closing a second end of said tubular member;
    a guide defining a valve seat and being fitted in and fixedly secured to said tubular member, said shutter being rotatably mounted within said guide;
    a control rod extending in the direction of the axis of said piston rod, said control rod being connected to said shutter;
    said orifice openings being formed in said guide;
    said check valve being positioned to cooperate with said valve seat on said guide to open and close said passage; and
    said adjusting mechanism further including an additional liquid passage bypassing said check valve and including a second plurality of orifice openings each having a different effective area, said additional liquid passage including a passage portion formed between said shutter and said guide, said second plurality of orifice openings being formed in said guide and being selectively communicated with said passage portion by said shutter.

2. In a hydraulic damper of the adjustable damping force type and including a cylinder containing hydraulic liquid therein, a piston working in said cylinder and partitioning the interior thereof into first and second liquid chambers, a piston rod secured to said piston and extending through said first liquid chamber to the outside of said cylinder, a valve mechanism mounted on said piston for generating damping force in both extension and contraction strokes of the damper, and an adjusting mechanism provided independently from said valve mechanism for adjusting the damping force, the improvement wherein said adjusting mechanism comprises:
    a coaxial bore formed in said piston rod and being permanently connected to said first liquid chamber through a radial hole formed in said piston rod;
    a tubular member having a first end secured to the inner end of said piston rod;
    a closure member closing a second end of said tubular member;
    a tubular guide having a valve seat and being fitted in and fixedly secured to said tubular member, said tubular guide having a circumferential wall having therein a first series of orifice openings each having a different passage area and being circumferentially spaced from each other and a second series of orifice openings each having a different passage area and being spaced circumferentially from each other and being axially spaced from said first series of orifice openings, said first series of orifice openings having respective radially outer ends communicating with said second liquid chamber, and said second series of orifice openings having respective radially outer ends communicating with said first liquid chamber through said coaxial bore in said piston rod;
    a generally tubular shutter slidably and rotatably disposed on the inner circumference of said tubular guide, said shutter including a circumferential wall having at least one opening formed therein for selectively communicating radially inner ends of said first and second series of orifice openings with the interior of said shutter;
    a control rod secured to said shutter and extending in the direction of the axis of said piston rod for rotating said shutter from outside the damper; and
    a check valve positioned to cooperate with said valve seat formed on said tubular guide and surrounding an axial opening formed in said tubular guide to open and close communication between said interior of said shutter and said coaxial bore in said piston rod through said axial opening formed in said tubular guide.

* * * * *